United States Patent
Bontu et al.

(10) Patent No.: US 9,485,768 B2
(45) Date of Patent: *Nov. 1, 2016

(54) ALLOCATING RESOURCES IN A FREQUENCY-TIME SPACE TO MOBILE STATION DATA

(71) Applicant: Apple Inc., Cupertino, CA (US)

(72) Inventors: Chandra Bontu, Nepean (CA); Parsya Larijani, Ottawa (CA); Mark Hawryluck, Kanata (CA)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/880,486

(22) Filed: Oct. 12, 2015

(65) Prior Publication Data

US 2016/0037518 A1 Feb. 4, 2016

Related U.S. Application Data

(63) Continuation of application No. 13/627,010, filed on Sep. 26, 2012, now Pat. No. 9,191,164, which is a continuation of application No. 11/999,919, filed on Dec. 7, 2007, now Pat. No. 8,300,591.

(60) Provisional application No. 60/869,273, filed on Dec. 8, 2006.

(51) Int. Cl.
| | |
|---|---|
| *H04W 4/00* | (2009.01) |
| *G01R 31/08* | (2006.01) |
| *H04W 72/04* | (2009.01) |
| *H04L 5/00* | (2006.01) |
| *H04J 11/00* | (2006.01) |

(52) U.S. Cl.
CPC .......... *H04W 72/0446* (2013.01); *H04J 11/00* (2013.01); *H04L 5/0007* (2013.01); *H04L 5/0037* (2013.01); *H04L 5/0069* (2013.01)

(58) Field of Classification Search
CPC .......................... H04L 5/007; H04W 72/0446
See application file for complete search history.

(56) References Cited

U.S. PATENT DOCUMENTS

| | | | |
|---|---|---|---|
| 6,865,185 | B1 | 3/2005 | Patel et al. |
| 6,996,400 | B2 | 2/2006 | Posti et al. |
| 7,031,272 | B2 | 4/2006 | Campanella |
| 7,313,126 | B2 | 12/2007 | Yun et al. |
| 7,489,993 | B2 | 2/2009 | Coffee et al. |
| 7,559,472 | B2 | 7/2009 | Silverbrook et al. |
| 7,609,608 | B2 | 10/2009 | Rogerson et al. |
| 7,826,415 | B2 | 11/2010 | Oh et al. |
| 7,881,739 | B2 | 2/2011 | Sarkar et al. |
| 7,912,435 | B2 | 3/2011 | Qi et al. |

(Continued)

OTHER PUBLICATIONS

IEEE Std. 802.16-2004, "Part 16: Air Interface for Fixed Broadband Wireless Access Systems", pp. 1-857, Oct. 1, 2004.

(Continued)

*Primary Examiner* — Gerald Smarth
(74) *Attorney, Agent, or Firm* — Meyertons, Hood, Kivlin, Kowert & Goetzel, P.C.

(57) ABSTRACT

To allocate resources in an orthogonal frequency domain multiple access (OFDMA) system, two-dimensional rectangular regions are assigned in a frequency-time space to data bursts associated with mobile stations. At least one data burst does not fit in an available space in the frequency-time space is determined. In response to the determining, the assigned two-dimensional rectangular regions are reshaped.

20 Claims, 4 Drawing Sheets

(56) References Cited

U.S. PATENT DOCUMENTS

| | | |
|---|---|---|
| 8,130,741 B2 | 3/2012 | Bae et al. |
| 2001/0012277 A1 | 8/2001 | Campanella |
| 2002/0030649 A1 | 3/2002 | Zavracky et al. |
| 2004/0008729 A1 | 1/2004 | Rogerson et al. |
| 2005/0025093 A1 | 2/2005 | Yun et al. |
| 2005/0075110 A1 | 4/2005 | Posti et al. |
| 2005/0118993 A1 | 6/2005 | Roux et al. |
| 2005/0197150 A1 | 9/2005 | Sarkar et al. |
| 2006/0039318 A1 | 2/2006 | Oh et al. |
| 2006/0056728 A1 | 3/2006 | Silverbrook et al. |
| 2006/0172704 A1* | 8/2006 | Nishio ............... H04L 5/0007 455/67.11 |
| 2007/0032832 A1* | 2/2007 | Feher ............... H04W 64/00 607/32 |
| 2008/0031190 A1 | 2/2008 | Bae et al. |
| 2008/0123609 A1 | 5/2008 | Qi et al. |

OTHER PUBLICATIONS

IEEE Std.802.16e-2005 and IEEE Std. 802.16-2004/Cor1-2005, "Part 16: Air Interface for Fixed and Mobile Broadband Wireless Access Systems, Amendment 2: Physical and Medium Access Control Layers for Combined Fixed and Mobile Operation in Licensed Bands and Corrigendum 1," pp. 1-822, Feb. 28, 2006.

\* cited by examiner

ALLOCATING RESOURCES IN A FREQUENCY-TIME SPACE TO MOBILE STATION DATA

CROSS-REFERENCE TO RELATED APPLICATIONS

This application is a continuation application of U.S. patent application Ser. No. 13/627,010, filed on Sep. 26, 2012, entitled "Allocating Resources in a Frequency-Time Space to Mobile Station Data", which is a continuation of Ser. No. 11/999,919, filed on Dec. 7, 2007, of the same title, now U.S. Pat. No. 8,300,591, which claims the benefit under 35 U.S.C. §119(e) of U.S. Provisional 5 Application Ser. No. 60/869,273, entitled "Efficient Implementation of WiMax Downlink Scheduler," filed Dec. 8, 2006, which are hereby incorporated by reference in their entirety as though fully and completely set forth herein.

TECHNICAL FIELD

The invention relates to allocating resources in an orthogonal frequency division multiple access system.

BACKGROUND

Orthogonal frequency division multiple access (OFDMA) allows for multiple users to share wireless resources of a wireless communications network in both frequency and time. A standard for OFDMA operation is according to IEEE (Institute of Electrical and Electronics Engineers) 802.16e. According to OFDMA, different users can be assigned different sets of subcarriers (at different frequencies), where the subcarriers are closely-spaced orthogonal subcarriers, with each subcarrier modulated with a modulation scheme. Each group of subcarriers assigned to a user is referred to as a subchannel.

According to OFDMA, a data region (also referred to as a data burst) that is to be communicated across the forward or downlink wireless link between a base station and a mobile station is provided with a two-dimensional allocation of a group of contiguous subchannels (frequency axis) within a group of contiguous OFDMA symbols (time axis). The allocated data region can be visualized as a rectangle, where the rectangle is made up of a number of subchannels in the subchannel axis (e.g., vertical axis) and a number of OFDMA symbols (e.g., horizontal axis).

An issue associated with allocation of OFDMA resources (including OFDMA symbols and subchannels) is that there is limited flexibility in how OFDMA resources are allocated to data bursts associated with different users in rectangular regions in frequency and time.

SUMMARY

In general, according to an embodiment, a method is provided for allocating resources in an orthogonal frequency domain multiple access (OFDMA) system, where two-dimensional rectangular regions are assigned in a frequency-time space to data bursts associated with mobile stations. In response to determining that at least one data burst does not fit in an available space in the frequency-time space, the assigned two-dimensional regions are re-shaped.

Other or alternative features will become apparent from the following description, from the drawings, and from the claims.

DETAILED DESCRIPTION

Figure 1:
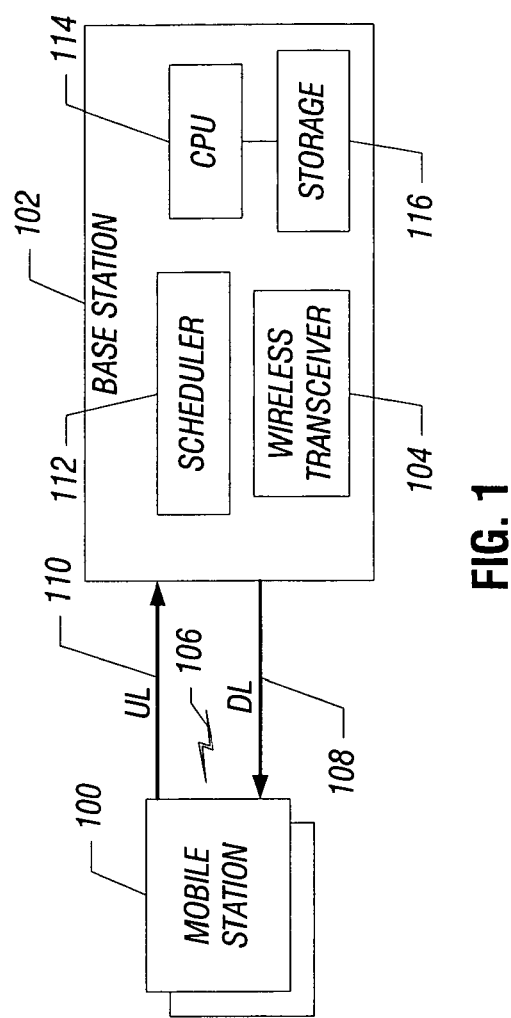
FIG. 1 is a block diagram of a network arrangement that includes mobile stations and a base station, in which some embodiments of the invention can be incorporated.

In the following description, numerous details are set forth to provide an understanding of some embodiments. However, it will be understood by those skilled in the art that some embodiments may be practiced without these details and that numerous variations or modifications from the described embodiments may be possible.

In accordance with some embodiments, allocation of resources in an orthogonal frequency domain multiple access (OFDMA) system is provided in which use of resources in a frequency-time space is optimized based on application of a shaping algorithm and fitting algorithm to fit as many data bursts associated with mobile stations as possible into the available space of the frequency-time space. According to OFDMA, a frequency-time space (or frequency-time domain) is defined by sub-carriers at different frequencies (on one axis) and OFDMA symbols at different times (on a second axis). Along the time axis, a sequence of OFDMA symbols is provided, where each symbol is associated with a particular symbol time duration. In one implementation, the OFDMA system is according to the protocol defined by IEEE 802.16e. Note that in other implementations, other types of OFDMA technologies can be used.

In the downlink path, from the base station to mobile stations, data bursts communicated from the base station to the mobile stations are each allocated a rectangular region of the frequency-time space of resources. In other words, each data burst takes up consecutive logical subchannels and consecutive OFDMA symbols. A subchannel is made up of a group of subcarriers at different frequencies. In the uplink direction (from mobile station to base station), data bursts may be non-rectangular two-dimensional regions in the frequency-time space. In the 802.16e standard, for example, normal uplink data bursts are allocated a number of allocation units termed slots. A slot is a logical frequency domain subchannel available for a fixed number of symbols. Slots are allocated in a time-first order starting from the lowest number subchannel on the lowest number symbol.

In the ensuing discussion, reference is made to allocating resources in the frequency-time space for downlink data bursts (from the base station to the mobile stations). However, note that the same or similar techniques can also be applied in the uplink direction where rectangular burst allocation is used.

In the downlink path, when allocating resources from the frequency-time space, different rectangular regions within the frequency-time space are allocated to different data bursts. A shaping algorithm is applied by a scheduler of the base station to shape the rectangular regions for different data bursts, in which the criterion for shaping the rectangular regions is that the frequency-time space should be as fully used as possible among the data bursts that are to be communicated from base station to mobile stations. In addition, the scheduler in the base station also applies a fitting algorithm to shape the rectangular regions according to a criterion that minimizes (or reduces) data burst errors.

Moreover, the scheduler in the base station is also able to determine whether or not one or more data bursts are unable to fit into the available space of the frequency-time space due to the shapings applied by the shaping and fitting algorithms. If that is the case, then the scheduler is able to relax the criteria used by either the shaping algorithm or the fitting algorithm, or both, to allow for more data bursts to be allocated to regions in the frequency-time space.

FIG. 1 illustrates example mobile stations 100 and an example base station 102 in a wireless network that implements an OFDMA technology. One such example wireless network is the Worldwide Interoperability for Microwave Access (WiMax) network. In other implementations, other types of wireless networks can also use the OFDMA technology.

The base station 102 can be connected to other network nodes (not shown) to enable communication between the mobile station 100 and an external network or another mobile station in the wireless network. The external network can be a packet data network such as the Internet, a local area network (LAN), a wide area network (WAN), and so forth.

The base station 102 includes a wireless transceiver 104 to perform wireless communications (e.g., radio frequency communications) over a wireless link 106 with the mobile station 100. The wireless communications includes downlink communications (108) and uplink communications (110).

The base station 102 also includes a scheduler 112 to allocate resources in the frequency-time space to communicate downlink data bursts to mobile nodes. Note that although just one base station 102 is depicted in FIG. 1, the wireless network usually includes multiple base stations.

The scheduler 112 can be part of the medium access control (MAC) layer of the base station 102. The scheduler 112 can be implemented as hardware, such as part of a central processing unit (CPU) 114 in the base station 102. Alternatively, the scheduler 112 can be implemented as software executable on the CPU 114. The base station 102 also includes a storage 116 connected to the CPU 114.

Figure 2:
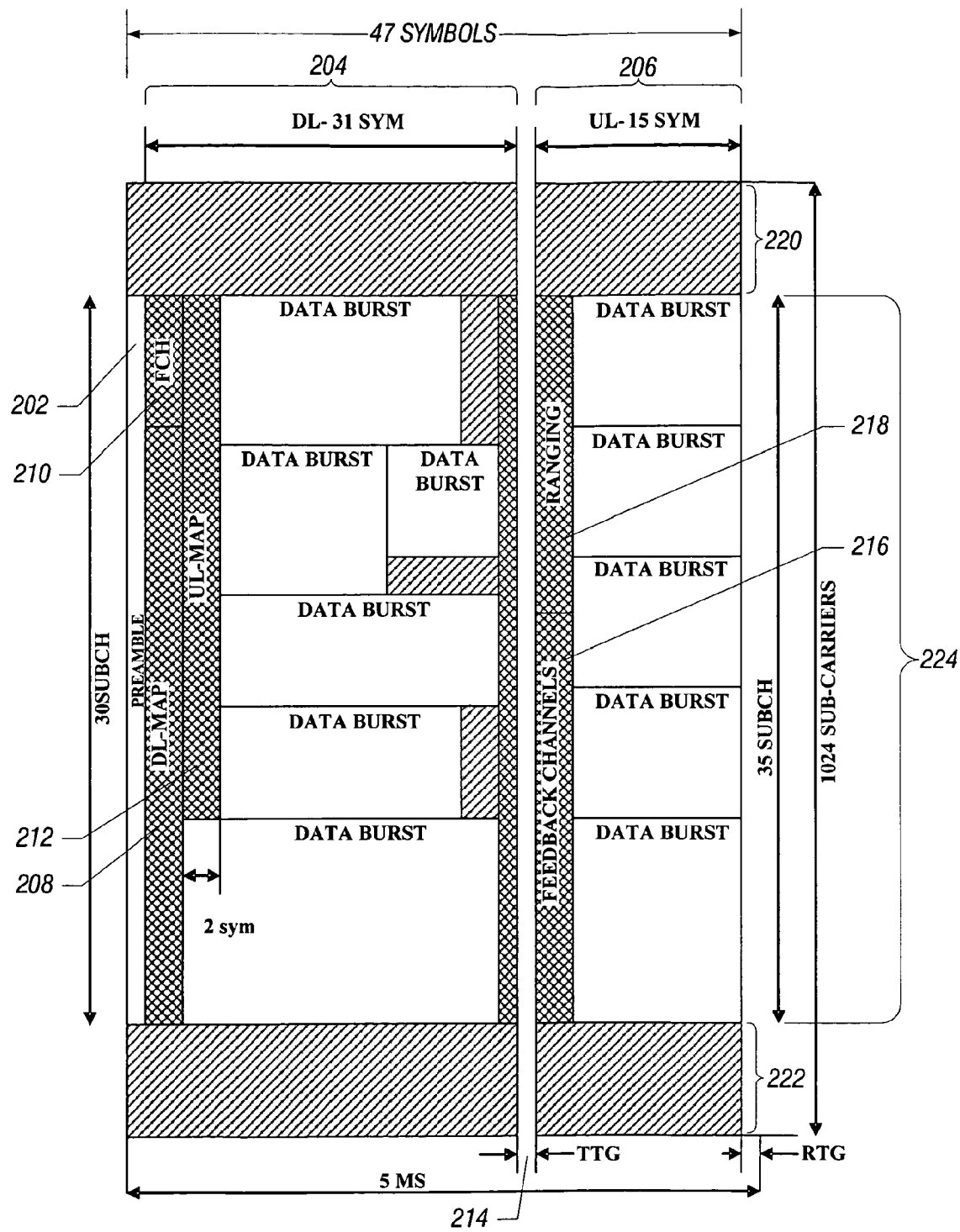
FIG. 2 illustrates an example frame containing rectangular regions assigned to data bursts, according to an embodiment.

FIG. 2 shows an example frame that is defined by 1,024 subcarriers and spans 5 milliseconds, according to one example implementation. The frame depicted in FIG. 2 is an example of allocation performed in a time division duplex (TDD) system. Note that techniques according to some embodiments can also be applied to frequency division duplex (FDD) allocations or any other type of bandwidth allocations.

In the example frame depicted in FIG. 2, the horizontal axis represents the time axis, whereas the vertical axis represents the frequency axis. Along the frequency axis, 1,024 subcarriers at corresponding different frequencies are provided. Along the time axis, multiple OFDMA symbols are provided, which in this example include 47 symbols. Note that the specific numbers given for the frame depicted in FIG. 2 are provided for purposes of example. In other implementations, different numbers of symbols and different numbers of subcarriers can be provided to define a frame.

Thus, in the frame of FIG. 2, the 5 millisecond duration is divided into 47 symbols. The first symbol 202 is used for the preamble, which is used by a mobile station to achieve downlink synchronization. The following D symbols 204 (31 symbols in the FIG. 2 example) are used to transmit data from the base station to the mobile station (downlink). The next U symbols 206 (15 symbols in the FIG. 2 example) are used to transmit data from the mobile station to the base station (uplink). As depicted, data bursts (as well as control messages) are assigned to corresponding two-dimensional regions of the frequency-time space defined by the frame.

In the example, note that the symbols following the preamble symbol 202 are also used to communicate broadcast messages describing downlink parameters and assignments, which in the example of FIG. 2 include a downlink map (DL-MAP) message 208 and a FCH (frame control header) message 210 for the downlink path. Another control message that is provided on the downlink path is the UL-MAP message 212. UL-MAP provides the uplink access definition, and DL-MAP provides the downlink access definition. Both DL-MAP and UL-MAP are MAC management messages that are point-to-multipoint messages.

In the frame depicted in FIG. 2, a transmit/receive transition gap (TTG) 214 is defined between the uplink and subsequent downlink parts of the frame, where the gap 214 allows time for the base station to switch between transmit and receive modes. Following the TTG 214, control messages are provided in the initial symbols in the uplink direction, where the control messages include feedback channels 216 and a ranging message 218. A receive/transmit transition gap (RTG) 215 is provided between the uplink and downlink to allow time for the base station to switch between transmit and receive modes.

The control messages depicted in FIG. 2 are also provided for purposes of example. In other implementations, other control messages can be provided in the frame and at different locations in the frame.

As further depicted in FIG. 2, an upper group 220 of subcarriers and a lower group 222 of subcarriers are defined as guard bands. The subcarriers in the guard bands 220, 222 are not used for communicating either control messages or data bursts, and the guard bands are provided to reduce interference from adjacent channels. The center part of the frame between the guard bands 220 and 222 is referred to as an active region 224, where resources from this active region 224 can be allocated to communication of control messages and data bursts in the uplink and downlink.

The subcarriers in the active region 224 (between the guard bands 220 and 222) are configured into groups of subcarriers, where each group is referred to as a subchannel. In one example, there are 840 subcarriers (including pilot and data subcarriers) between in the active region 224, where these 840 subcarriers can be configured into 30 subchannels on the downlink and 35 subchannels in the uplink, in one example.

In the active region 224, slots are defined, where a slot can be defined as a region in the frame made up of one subchannel by two OFDMA symbols. A slot is the minimum resource that can be allocated to a mobile station. In alternative implementations, a slot can be made up of different numbers of subchannels and OFDMA symbols.

Thus, in the example depicted in FIG. 2, there are 450 slots available, where these 450 slots are allocated to communication of control messages and data. In allocating slots to data bursts associated with different mobile stations, the allocation is based on the priority (or quality of service) associated with the mobile stations.

In accordance with some embodiments, the data bursts are allocated to rectangular regions in the frequency-time space. In the downlink path, the data bursts can be shaped and fitted using a two-dimensional (2D) shaping algorithm and 2D fitting algorithm to meet predefined criteria. As noted above, the predefined criterion used by the shaping algorithm for shaping rectangular regions of the frequency-time space for data bursts is a criterion to optimize (maximize) the amount of the frequency-time space that is used. The fitting criterion uses a criterion to minimize (or otherwise reduce) data burst errors. The scheduler 112 is also able to determine if any data burst in the downlink path cannot be fitted into the available frequency-time space, and in response to such determination, the scheduler 112 is able to re-shape the rectangular regions of the frequency-time space to fit the data burst(s) that previously could not fit into the frequency-time space. As noted above, the re-shaping is accomplished by relaxing the criteria used by the shaping and/or fitting algorithms.

Figure 3:
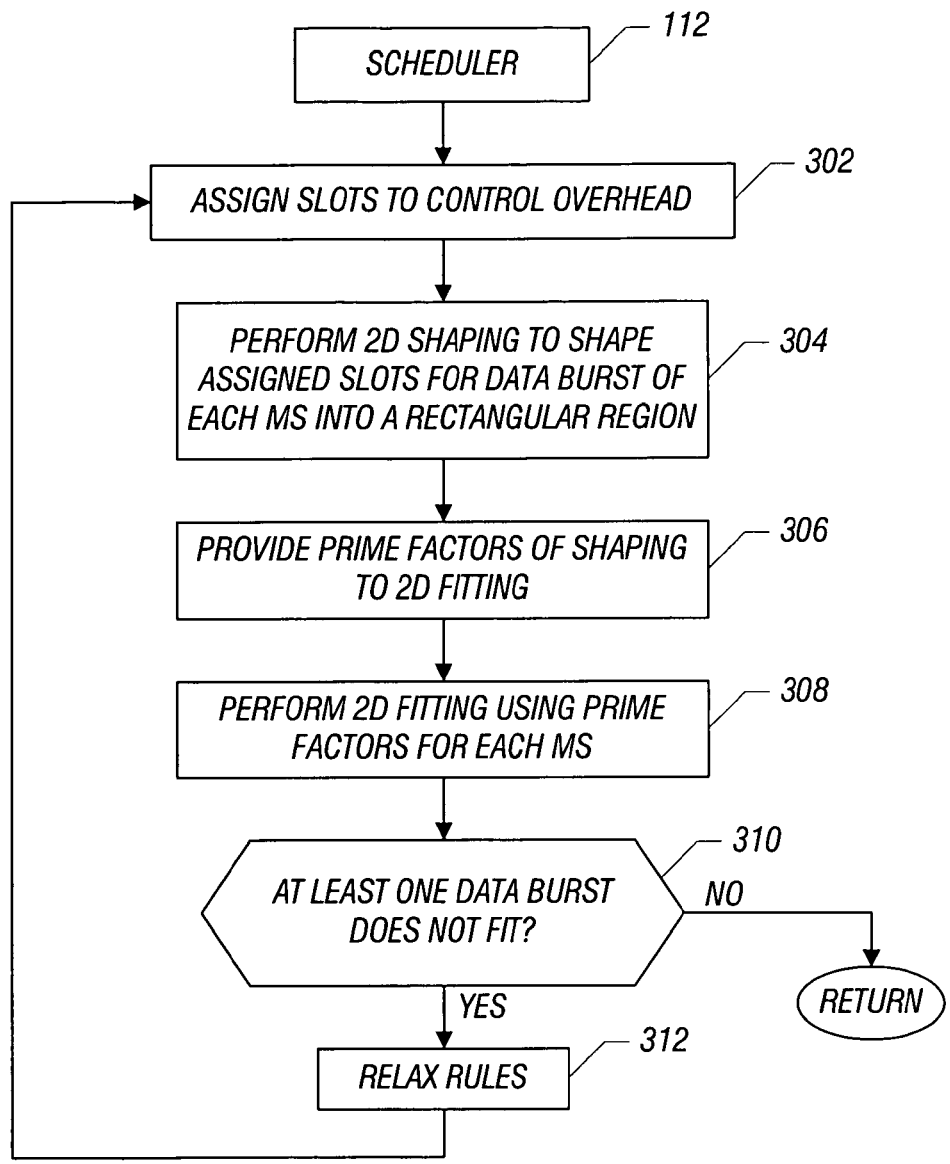
FIG. 3 is a flow diagram of a process of assigning rectangular regions in a frequency-time space, according to an embodiment.
Figure 4:
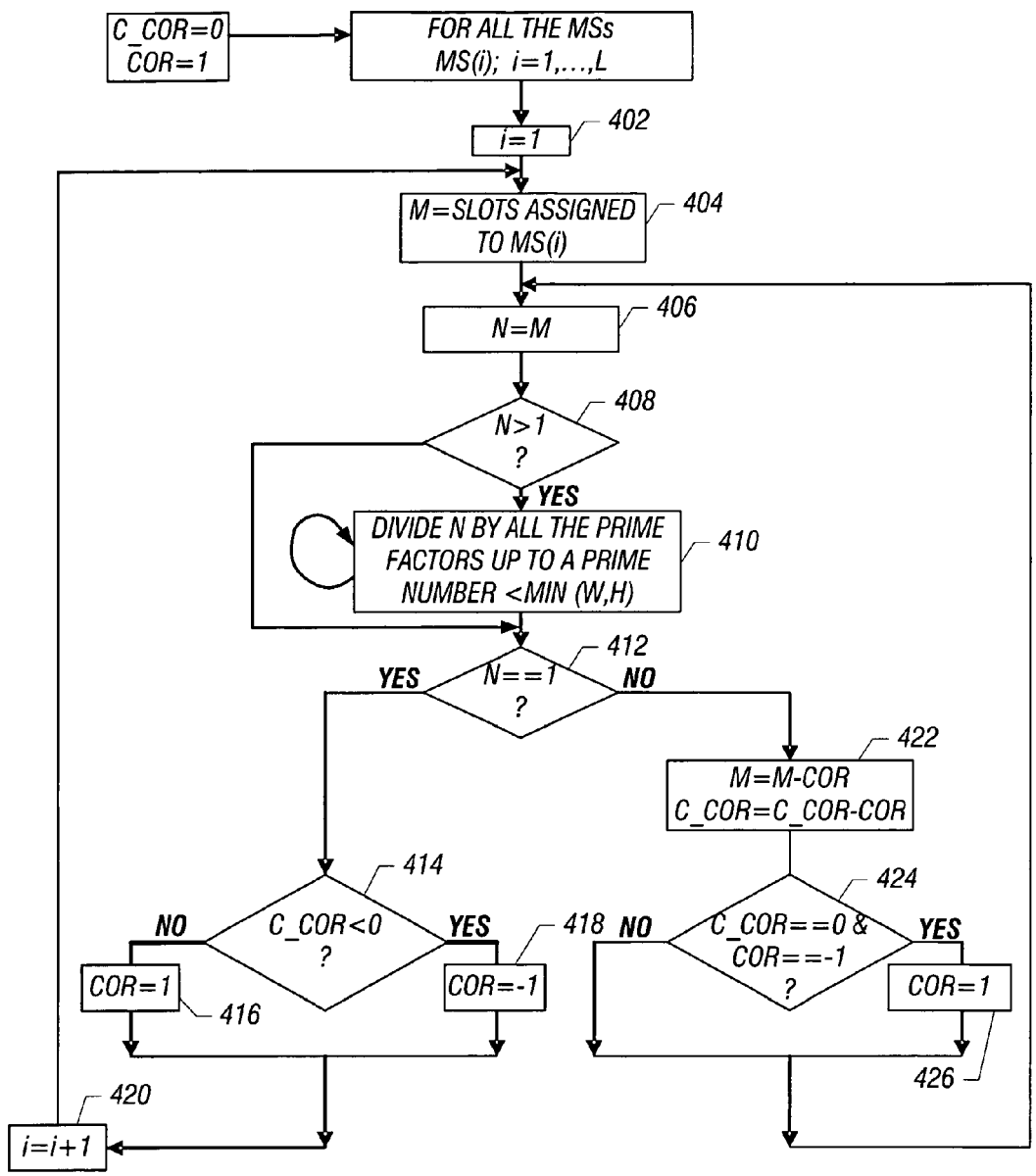
FIG. 4 is a flow diagram of a process of shaping rectangular regions, according to an embodiment.

FIG. 3 is a flow diagram of a process of assigning resources in the frequency-time space by the scheduler 112 (FIG. 1) of the base station 102 for downlink information (which includes control messages and data bursts). Initially, slots are assigned (at 302) to the control overhead (including, as examples, the control messages 208, 210, and 212 in FIG. 1). Next, the 2D shaping algorithm is performed (at 304) to shape assigned slots for data bursts of each mobile station into a rectangular region. Details of the 2D shaping performed at 304 is depicted in FIG. 4, discussed further below.

As part of the 2D shaping performed at 304, prime factors are calculated. The prime factors are prime numbers into which the number of slots assigned to each data burst of a mobile station is divisible. The prime factors are provided (at 306) to a 2D fitting algorithm. Computation of the prime factors are further discussed below.

Next, the 2D fitting algorithm is performed (at 308) using the prime factors for the data burst of each mobile station. The criterion used by the 2D fitting algorithm is to minimize or reduce burst errors. Mobile stations can be categorized into fast-moving mobile stations (such as mobile stations in vehicles) or slow-moving mobile stations (such as mobile stations carried by pedestrians). For fast-moving mobile stations, the number of OFDMA symbols allocated is increased, while the number of subchannels allocated is decreased. Effectively, for fast-moving mobile stations, the ratio of the width of the rectangular region to the height of the rectangular region is maximized (to provide a wide, flat rectangular region).

On the other hand, for a slow-moving mobile station, a smaller number of OFDMA symbols are assigned, whereas a larger number of subchannels are assigned. This results in a tall, skinny rectangular region, where the ratio of the height of the rectangular region to the width of the rectangular region is maximized.

For mobile stations that fall between fast-moving and slow-moving ("intermediate mobile stations"), the rectangular region allocated to each of such intermediate level stations should be as close to a square as possible. Fast-moving versus slow-moving mobile stations can be categorized based on predefined thresholds, where a fast-moving mobile station is defined as a mobile station that is moving at greater than a predefined speed (threshold 1), whereas a slow-moving mobile station is defined as a mobile station that is moving at slower than a predefined speed (threshold 2). Mobile stations that are moving at speeds between threshold 1 and threshold 2 are categorized as intermediate mobile stations.

As depicted in FIG. 3, the scheduler 112 determines (at 310) whether at least one data burst associated with a mobile station does not fit in the available frequency-time space. If there is no such data burst that does not fit, then the scheduling of data bursts is completed and the process can proceed to scheduling for the next frame.

However, if there is at least one data burst that does not fit in the available frequency-time space, then the scheduling rules are relaxed (at 312), and the process proceeds back to repeat tasks 302, 304, and 308 according to the relaxed rules so that the assigned rectangular regions can be reshaped to accommodate additional mobile stations in the frequency-time space. For example, instead of maximizing the ratio of the width to the height of the rectangular region for a fast-moving mobile station or maximizing the ratio of the height to the width of the rectangular region for a slow-moving mobile station, more relaxed ratios can be specified. In other words, for a fast-moving mobile station, instead of a flat, wide rectangular region, a less wide and less flat rectangular region can be defined. Similarly, for a slow-moving mobile station, instead of a tall, skinny rectangular region, a less tall and a less skinny rectangular region can be defined for the slow-moving mobile station.

The procedure of FIG. 3 is iterated until as many data bursts as possible can be fit into the available frequency-time space.

FIG. 4 shows a process according to an embodiment of shaping allocated resources for each mobile station into a rectangular region. For all mobile stations MS(i), i=1, . . . , L, where L represents the number of data bursts for the mobile stations, each mobile station MS(i) is processed in sequence. Initially, i is set (at 402) to 1. Then, M is set (at 404) to be equal to the number of slots assigned to MS(i), where a number of slots assigned to MS(i) is an initial number of slots assigned by the scheduler 112.

Next, N is set equal to M (at 406). Then, it is determined (at 408) whether N is greater than 1. If so, then N is divided (at 410) recursively (in a loop) by all prime factors up to a prime number that is less than min(W,H), where W represents the number of pairs of symbols in the downlink part of the active region 224 of FIG. 2, and H represents the number of subchannels in the downlink part of the active region 224. In the above example, since there are 31 symbols in the downlink part of the active region 224, W is equal to 31/2=15 (fractional part removed). Also, since there are 30 subchannels in the downlink part of the active region 224, H is equal to 30.

In a specific example, if N=30, then the prime factors would be as follows: 2, 3, 5. In other words, in the recursive loop performed at 410, N=30 is first divided by the prime factor 2 to produce 15, and 15 is divided by the prime factor 3 to produce 5, and 5 is divided by the prime factor 5 to produce 1.

Next, it is determined (at 412) whether N (after division by the prime factors at 410) is equal to 1. If so, then the number of slots assigned to MS(i) is exactly divisible by prime factors. On the other hand, if N is not equal to 1, then the number of slots assigned to MS(i) is not exactly divisible by prime factors, so that M has to be adjusted.

In the case where N is equal to 1, it is determined (at 414) if a cumulative correction factor C_Cor is less than zero. Note that C_Cor is initially set to zero. If not, then the correction factor Cor is set (at 416) equal to 1. However, if C_Cor is less than zero, then Cor is set (at 418) equal to −1. As will be explained further below, Cor is used to adjust M, which represents the number of slots assigned to MS(i), in the scenario where M is not exactly divisible by prime factors.

Next, i is incremented (at 420) by 1 and the process returns to 404 for the next data burst of the next mobile station MS(i).

If M is not equal to 1, as determined at 412, then the value of M is adjusted (at 422) as follows: M=M−Cor. Also, the cumulative correction factor C_Cor is adjusted as follows: C_Cor=C_Cor−Cor. If Cor is positive, then the number of slots assigned to MS(i) is reduced. However, if Cor is negative, then the number of slots assigned to MS(i) is increased.

After adjusting M and C_Cor, it is determined (at 424) if C_Cor is equal to zero, and Cor is equal to −1. If so, then Cor is set to 1 (at 426). If not, no further adjusted computation is performed, and the process returns to 406 to again determine if M is exactly divisible by prime factors.

As noted above, the prime factors into which M is divisible are identified and provided to the 2D fitting algorithm (306 in FIG. 3). In the example above, where M=30, the prime factors into which M is divisible are as follows: 2, 3, 5. In the 2D fitting algorithm, if the mobile station is a fast mover, then the rectangular region allocated to the data burst of the fast mover would be 15×2, where 15 is computed from 3×5. This provides a wide, flat rectangular region where the ratio of the width to the height of the rectangular region is maximized. On the other hand, if the mobile station is a slow mover, then the allocated rectangular region would be 2×15 to maximize the ratio of the height to width of the rectangular region.

In the example above, if it is determined that at least one data burst of at least one mobile station cannot fit into available space of the frequency-time space, then rules are relaxed, including the ratio rules associated with fast and slow movers. Assuming that the mobile station in the example above where M=30 is a fast mover, then instead of assigning a 15×2 rectangular region, the 2D fitting algorithm can attempt to fit the data burst into a 10×3 rectangular region, where 10 is computed from 2×5 (prime factors). If this assigned region still does not allow for the other data burst to fit, then the data burst of the fast mover is fit into a 6×5 region (where 6 is computed from 2×3). Another rule that is relaxed is that the rectangular regions for intermediate mobile stations do not have to be as square as possible. Note that the fitting algorithm continues to use the identified prime factors to reshape the allocated regions.

Note that the specific values used for the various parameters C_Cor and Cor under different scenarios can be varied for other embodiments. For example, instead of setting Cor to +1 or −1, Cor can be set to other positive or negative numbers. Note that care is taken such that the cumulative correction factor C_Cor over all mobile stations does not exceed the maximum number of slots in a frame.

By using the scheduling procedure described above, a flexible mechanism is provided to allocate rectangular regions in the frequency-time space such that utilization of the frequency-time space is maximized or enhanced.

Instructions of software described above (e.g., scheduler 112 in FIG. 1) are executed on a processor. The processor includes microprocessors, microcontrollers, processor modules or subsystems (including one or more microprocessors or microcontrollers), or other control or computing devices. A "processor" can refer to a single component or to plural components.

Data and instructions (of the software) are stored in respective storage devices, which are implemented as one or more computer-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method of allocating resources in an orthogonal frequency domain multiple access (OFDMA) system, comprising:
   a wireless device assigning two-dimensional rectangular regions in a frequency-time space to data bursts associated with mobile stations using at least one predefined shaping rule;
   the wireless device determining that at least one data burst does not fit in an available space in the frequency-time space; and
   in response to the determining, the wireless device reshaping the assigned two-dimensional rectangular regions, wherein reshaping the assigned two-dimensional rectangular region comprises modifying the at least one predefined shaping rule to adjust a shape of at least one rectangular region specified by the at least one predefined shaping rule.

2. The method of claim 1, wherein assigning the two-dimensional rectangular regions in the frequency-time space is based on a criterion that specifies that the frequency-time space is to be as fully utilized as possible.

3. The method of claim 1, further comprising:
   applying a fitting algorithm to further define the two-dimensional rectangular regions, where the fitting algorithm assigns differently shaped two-dimensional regions to fast-moving mobile stations and to slow-moving mobile stations.

4. The method of claim 3, wherein the fitting algorithm uses a criterion that specifies that data burst errors is to be reduced.

5. The method of claim 3, wherein the fitting algorithm increases a ratio of a width of the rectangular region to a height of the rectangular region for a mobile station that is fast moving, and increases a ratio of a height of the rectangular region to a width of the rectangular region for a mobile station that is slow moving.

6. The method of claim 5, wherein the fitting algorithm specifies that the corresponding two-dimensional rectangular region is to be as close as possible to a square for a mobile station that is neither fast moving nor slow moving.

7. The method of claim 1, further comprising:
   dividing a number of slots in the two-dimensional rectangular region allocated to each mobile station by prime factors;
   providing the prime factors to a fitting algorithm; and
   using, by the fitting algorithm, the prime factors to further shape the two-dimensional rectangular regions.

8. The method of claim 7, further comprising using combinations of the prime factors to define a height and a width of the two-dimensional rectangular region for each mobile station.

9. The method of claim 8, wherein using the prime factors to further shape the two-dimensional rectangular region for each mobile station comprises:
using the prime factors to define a wide, flat rectangular region for a fast-moving mobile station; and
using the prime factors to define a tall, skinny rectangular region for a slow-moving mobile station.

10. The method of claim 7, further comprising:
determining whether the number of slots is exactly divisible by the prime factors;
in response to determining that the number of slots is not exactly divisible by the prime factors, adjusting the number of slots in the corresponding two-dimensional rectangular region.

11. The method of claim 1, wherein assigning the two-dimensional rectangular regions in the frequency-time space comprises assigning the two-dimensional rectangular regions for downlink data bursts.

12. A base station comprising:
a wireless transceiver, configured to communicate with mobile stations; and
processing hardware coupled to the wireless transceiver, wherein the processing hardware is configured to implement a scheduler, wherein the scheduler is configured to:
assign data bursts associated with mobile stations communicated with the base station to two-dimensional rectangular regions in a frequency-time space; and
shape the two-dimensional rectangular regions based on speeds of the mobile stations.

13. The base station of claim 12, wherein the scheduler is configured to further:
determine that at least one data burst does not fit in an available space in the frequency-time space; and
in response to the determining, reshaping the assigned two-dimensional rectangular regions.

14. The base station of claim 13, wherein the scheduler is configured to further relax rules associated with shaping the two-dimensional rectangular regions according to the speeds of the mobile stations in reshaping the assigned two-dimensional rectangular regions.

15. A non-transitory, computer-readable storage medium containing program instructions executable by a processor to:

assign two-dimensional rectangular regions in a frequency-time space to data bursts associated with mobile stations using at least one predefined shaping rule;
determine that at least one data burst does not fit in an available space in the frequency-time space; and
in response to the determining, reshape the assigned two-dimensional rectangular regions, wherein reshaping the assigned two-dimensional rectangular region comprises modifying the at least one predefined shaping rule to adjust a shape of at least one rectangular region specified by the at least one predefined shaping rule.

16. The non-transitory, computer-readable storage medium of claim 15, wherein the program instructions are further executable to:
apply a fitting algorithm to further shape the two-dimensional rectangular regions, where the fitting algorithm shapes the two-dimensional regions according to speeds of the mobile stations.

17. The non-transitory, computer-readable storage medium of claim 16, wherein the fitting algorithm increases a ratio of a width of the rectangular region to a height of the rectangular region for a mobile station that is fast moving, and increases a ratio of a height of the rectangular region to a width of the rectangular region for a mobile station that is slow moving.

18. The non-transitory, computer-readable storage medium of claim 17, wherein the fitting algorithm specifies that the corresponding two-dimensional rectangular region is to be as close as possible to a square for a mobile station that is neither fast moving nor slow moving.

19. The non-transitory, computer-readable storage medium of claim 15, wherein the program instructions are further executable to:
divide a number of slots in the two-dimensional rectangular region allocated to each mobile station by prime factors;
provide the prime factors to a fitting algorithm; and
use, by the fitting algorithm, the prime factors to further shape the two-dimensional rectangular regions.

20. The non-transitory, computer-readable storage medium of claim 19, wherein the program instructions are further executable to:
use combinations of the prime factors to define a height and a width of the two-dimensional rectangular region for each mobile station.

* * * * *